July 1, 1941. G. C. WHITING 2,248,015
FIREARM
Filed Dec. 24, 1938 5 Sheets-Sheet 3
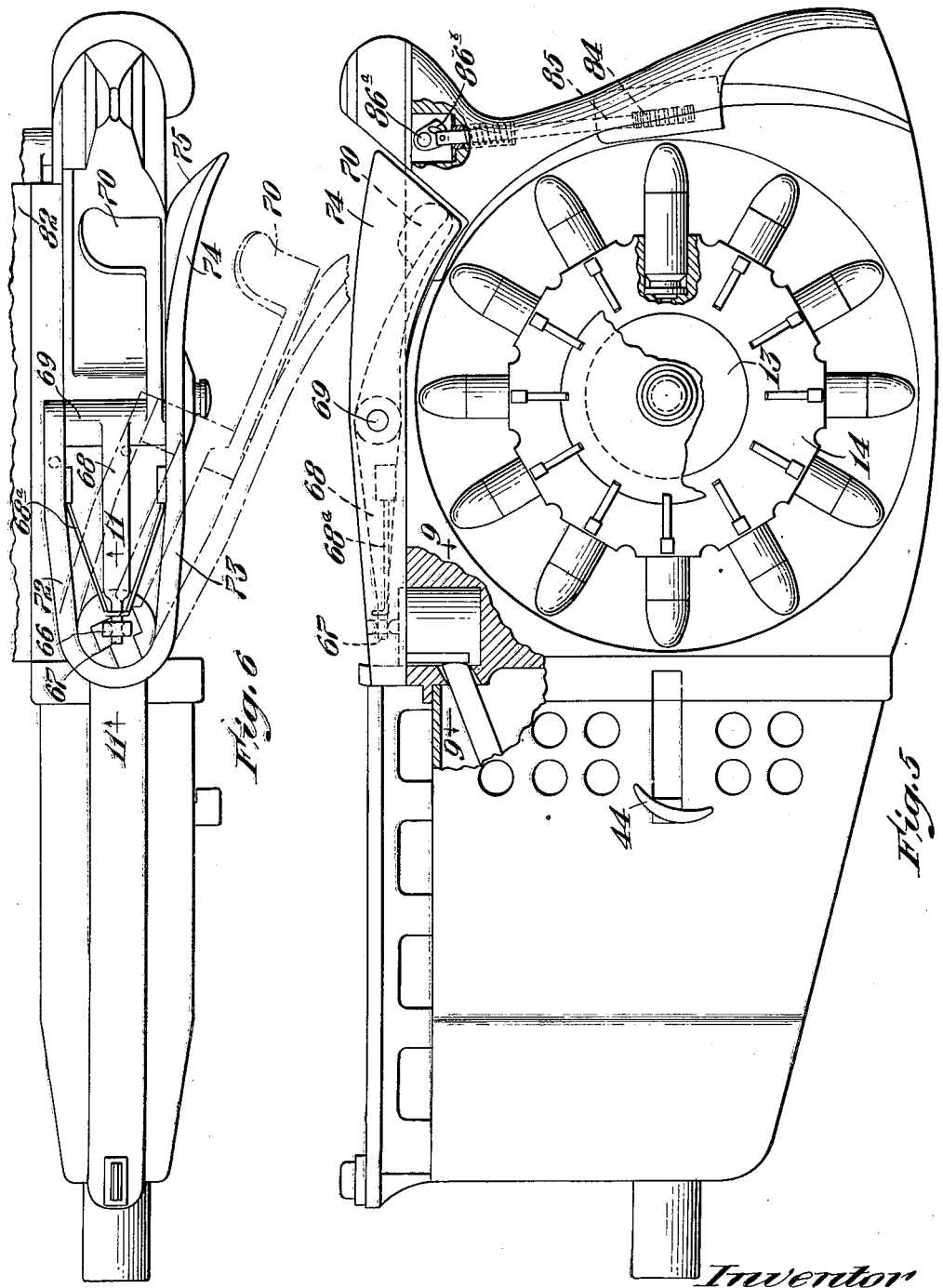
Inventor
George C. Whiting
By Roberts Cushman & Woodberry
Att'ys.

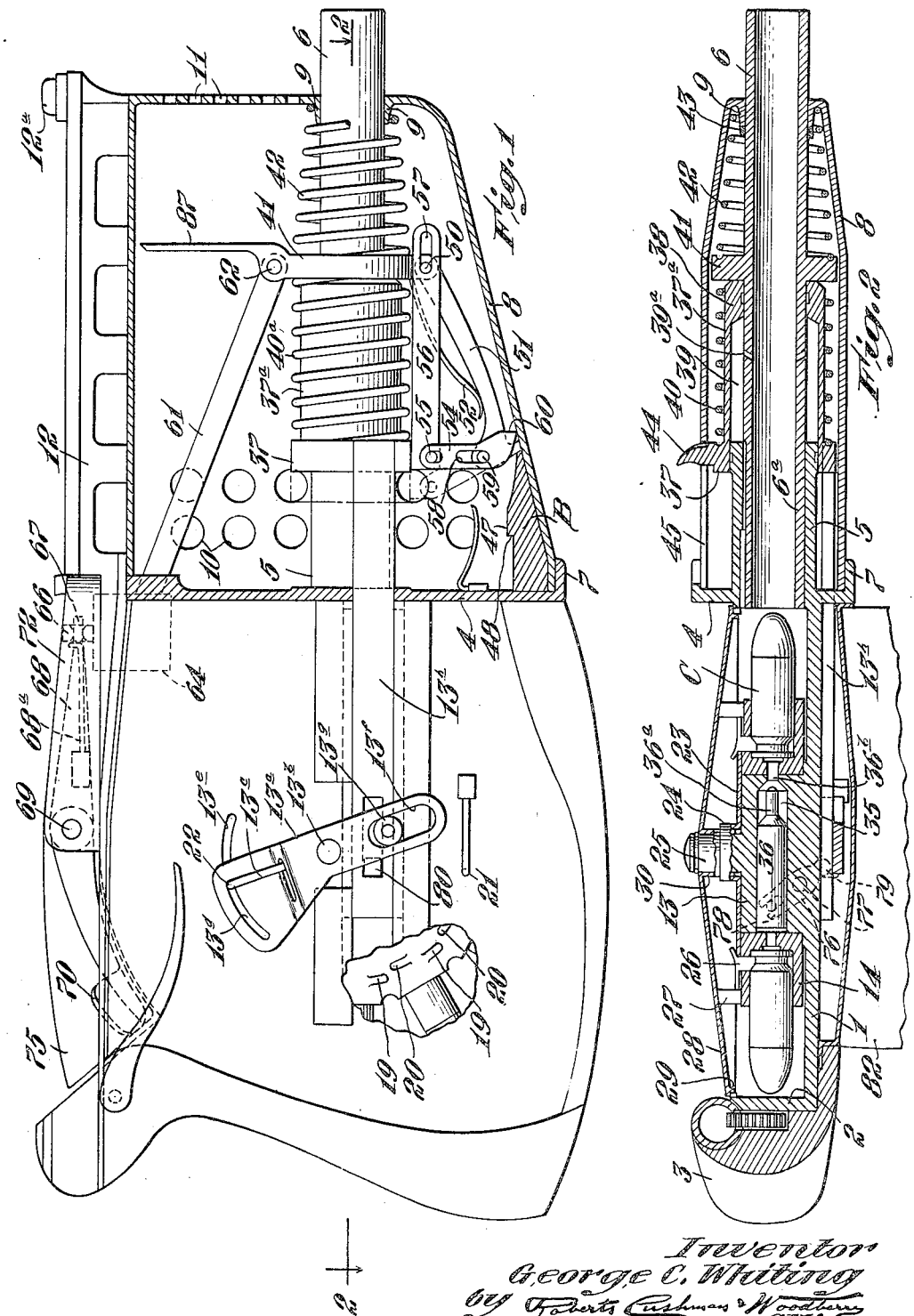

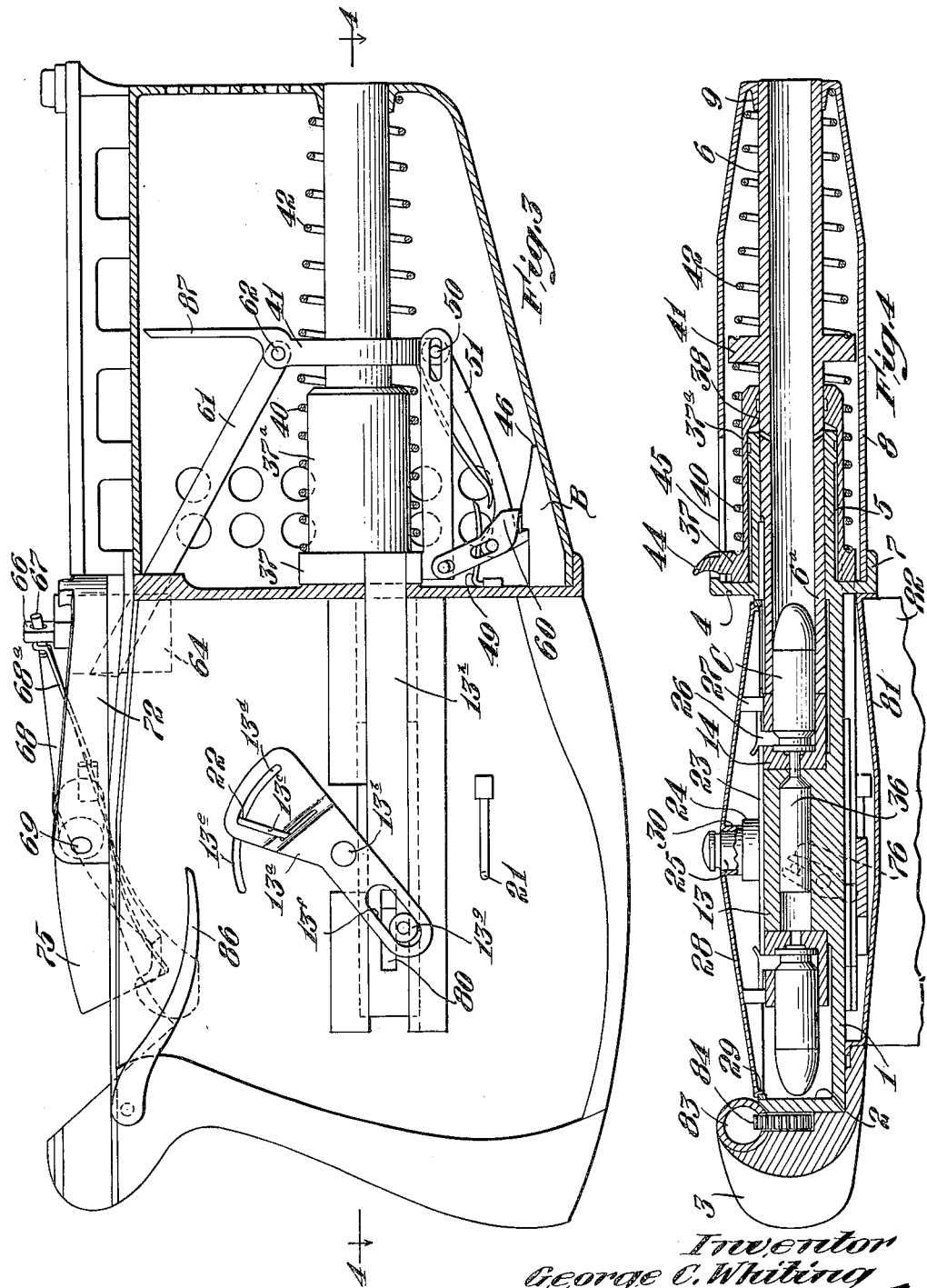

July 1, 1941. G. C. WHITING 2,248,015
FIREARM
Filed Dec. 24, 1938   5 Sheets-Sheet 4
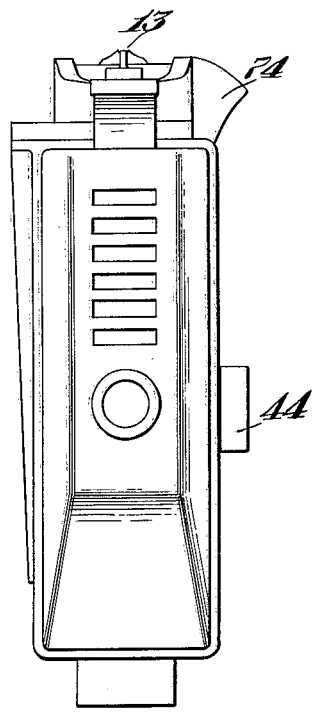
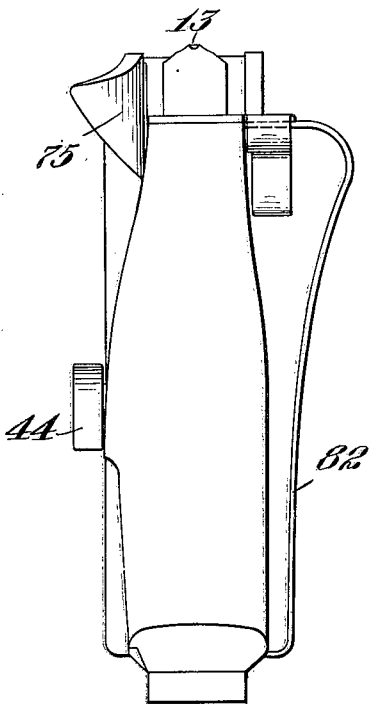
Fig.7   Fig.8
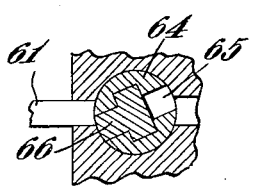 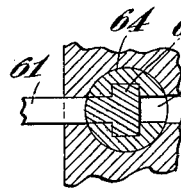 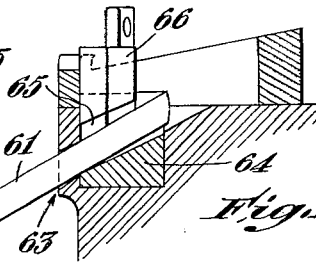
Fig.9   Fig.10   Fig.11
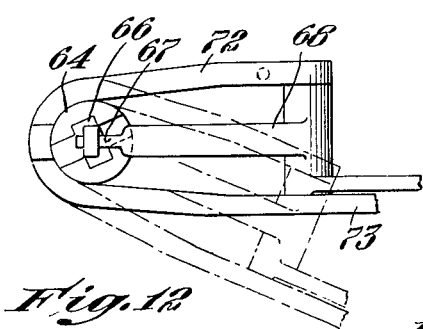
Fig.12
Inventor
George C. Whiting
by Roberts Cushman & Woodberry
Att'ys.

July 1, 1941.  G. C. WHITING  2,248,015
FIREARM
Filed Dec. 24, 1938  5 Sheets—Sheet 5

Inventor
George C. Whiting
by Roberts Cushman & Woodbury
Att'ys

Patented July 1, 1941

2,248,015

UNITED STATES PATENT OFFICE 2,248,015

FIREARM

George C. Whiting, Hingham, Mass., assignor to Julian D. Rosenberg, New York, N. Y.

Application December 24, 1938, Serial No. 247,591

12 Claims. (Cl. 89—3)

This invention pertains to firearms, and relates more particularly to a repeating automatic firearm, and while herein specifically disclosed as embodied in a side-arm, many of the novel features of the invention are equally applicable to and useful in other types of firearm. As illustrated and more fully described hereinafter, the improved firearm of the present invention is designed to be used in substitution for the ordinary revolver or automatic pistol, and while possessing the outstanding advantages of each of the latter types, avoids certain faults well recognized as respectively characteristic of them.

The usual revolver is necessarily quite limited as to the number of rounds that can be fired before reloading. Moreover, reloading a revolver is an operation which is relatively slow, requiring as it does the extraction of the empty cartridge cases and the insertion of fresh rounds in the several chambers of the cylinder. If the usual double-action revolver is fired from thumbcock, the rate of fire is too slow to be tolerated in the service in which small arms generally are employed. If it be fired "quick-fire" the length of trigger pull and the weight of trigger pull requisite for cocking the hammer is such as very materially to disturb the aim. Moreover, with revolvers as heretofore designed there is the possiblity that a round may be discharged when, owing to some imperfection in the mechanism, the cylinder and barrel are not in perfect alignment. Further, there is necessarily a gap between the cylinder and barrel close to the point of maximum gas pressure through which a certain amount of the gas escapes, with corresponding loss in efficiency. There is also a slight space between the rear end or head of the cartridge and the breech block, which makes accurate adjustment of the firing pin or spur quite difficult.

While the automatic pistol has none of the undesirable features of the revolver which have just been mentioned, it does have others. For example, it is awkward and slow to cock and is less reliable than a revolver. The mechanical manipulation required to take a cartridge from the magazine, insert it in the barrel, and, after firing, to extract and eject the cartridge case, necessitates the use of an intricate mechanism which is quite liable to failure in service. It is well recognized that the automatic pistol is easily jammed, and almost invariably such failure of the pistol to function is traceable to defects in the loading, extracting and ejecting mechanism.

Another fault which is common both to the conventional revolver and the automatic pistol is the tendency of the muzzle to kick up when the gun is fired, due partly to the couple set-up between the line of recoil and the center of gravity of the fire-arm, and partly to the offset of the grip through which recoil is opposed. While it is true that attempts have heretofore been made to correct the above defects in small arms, for instance, by the use of a radially chambered magazine housed in a casing designed to be embraced by the user's hand, such attempts have usually failed to produce a practical weapon, for example, for the reason that as heretofore constructed and held the dimensions of such a magazine or cartridge holder were necessarily so restricted as to preclude the use of ammunition of the size and power demanded in a service arm.

As constrasted with side-arms of these prior types, the gun of the present invention is so devised that it may fire an unusually large number of rounds, for example, twelve, from chambers in which the cartridges have been placed manually and from which they are manually extracted, as in the conventional revolver; to provide means whereby the holder in which the cartridges are placed and in which they are fired may readily be removed bodily from the gun and quickly replaced with a similar holder previously loaded, in a manner somewhat resembling the mode of removing and loading the clip of an automatic pistol; to be easily cocked initially, and, after the firing of the first round, maintained mechanically in a cocked and ready-to-fire condition, so long as there is unfired ammunition in the gun, this being accomplished by using gas generated in firing to perform the necessary work; to employ a rotary multi-chambered cartridge holder, as does the revolver, but with the parts so arranged that before a round can be fired the bullet and a part of the cartridge case must be in a solid barrel, as in a pistol, with the cartridge case bridging the crevice between the holder and the breech end of the barrel; to have a light and adjustable trigger pull (or more exactly speaking, trigger push, since the trigger is thumb-actuated); to absorb recoil along a line passing through the center of gravity of the firearm, and to oppose the recoil by means of a novel grip, whereby unusually rapid fire with any type of ammunition can be maintained without danger of kicking up the muzzle; to provide means whereby the gun may be safely carried on the belt at full cock; and to provide means such that the gun is secure and snatch-proof while carried on the belt, and yet is clear for instant action when wanted.

Briefly stated, the attainment of the above advantages in accordance with the present invention involves the following structural features and modes of operation:

The cartridge holder or magazine is an annulus having radial chambers each designed to receive a cartridge and each having a rigid bottom wall to support the cartridge head; this annular holder is mounted in the frame to turn about a transverse horizontal axis perpendicular to and intersecting the axis of the barrel, the holder turning on a rigid stud which constitutes the breech block. The chambers of the cartridge holder are only deep enough to hold the rear part (for example, the rear half of the cartridge), leaving the remainder of the cartridge projecting radially, such projecting end being received within the breech end of the barrel at the time of firing. The barrel is axially movable. A gas-actuated piston acts at the instant of firing to move the barrel forwardly far enough to release or extract the empty cartridge case from the breech of the barrel and to allow the holder to be rotated so as to place a fresh cartridge in firing position.

At the instant of firing the breech end of the barrel embraces the forward end of the cartridge case so that the crevice between the holder and barrel is bridged by the case. At this time the holder is locked, and the barrel is also locked against possibility of forward movement due to bullet friction; however, when the bullet passes a certain point in the barrel, ports are uncovered through which the gas generated at firing is admitted to act upon the barrel-actuating piston.

As a round is fired the first step in the cycle of operations of the gun mechanism is the forward movement of the piston which, as it is impelled forwardly, first releases the barrel from its locked firing position and then proceeds to push the barrel forwardly until the barrel has reached its utmost forward position. At this point the barrel is automatically locked with its breech end so far from the cartridge holder as to clear the tips of the bullets as the holder is rotated to bring a fresh cartridge into firing position. The piston starts to return to its initial position as soon as the gas pressure drops, being returned by a suitable spring. As the piston begins its return movement it operates appropriate connections whereby the cartridge holder is turned through a predetermined angle sufficient to bring a fresh cartridge into alignment with the barrel. As the piston continues its return movement, it then actuates means for unlocking the barrel, whereupon a suitable spring restores the barrel to initial position. As the barrel returns toward the firing position in which the breech of the barrel houses the forwardly projecting part of the newly positioned cartridge case and the projecting nose of the bullet, locking means comes into action to lock the barrel in firing position, and instantly thereafter, and as the breech end of the barrel engages the peripheral surface of the cartridge holder, connections, receiving their actuating impulse from the rearwardly moving barrel, operate the hammer thereby firing the round which has just been placed in firing position. That is to say, the final rearward movement of the barrel itself operates the hammer so that discharge is impossible until the barrel has first embraced the protruding portion of the cartridge and has properly set and locked itself in firing position.

The above cycle of operations is repeated until the ammunition is exhausted except for trigger interruption, the firearm as herein disclosed being designed to work like a machine gun, that is to say, fire will commence when the trigger is pressed and will continue until the trigger is released or until ammunition is exhausted. If desired, and without affecting the general design, trigger control may be made to operate with a single pull for each shot, as with the conventional automatic pistol, or to operate in either manner, as desired.

To prevent accidental discharge of the gun, a trigger guard is provided which must first be swung to a firing position before the trigger can be actuated. In its preferred form, this trigger guard is so designed and arranged that the mere act of attempting to place the thumb of the user in operative engagement with the trigger will move the guard out of its normal position so as to permit firing. However, when the gun is fired, the firing mechanism is left in cocked position and no further cocking is necessary until the cartridges have all been fired and the magazine replaced. After once being cocked a mere holding of the trigger in depressed position results in discharge of all of the cartridges in rapid succession, unless interrupted by the release of the trigger.

The gun of the present invention is devised for thumb actuation of the trigger while the four fingers are held extended substantially straight and directed forwardly along the side of the frame of the gun, the rear edge of the butt of the gun resting against the pad of the palm of the hand. The design is such that in aiming or firing, the gun forms in effect an extension of the extended arm of the user, the axis of the barrel passing through the center of gravity of the gun and the center of the rear end of the butt so that the recoil action has no tendency to rock the barrel and is directed along the length of the user's forearm.

In order to assist the user in so holding the gun during firing, as just described, the side of the stock or butt is provided with a pocket or mitt into which the open hand of the user is slipped and which holds the fingers firmly in contact with the side of the frame, with the rear edge of the butt resting firmly against the pad of the palm.

Preferably the gun is worn without a holster, swinging from the wearer's belt, the belt being provided with a suitable hook which fits within a socket in the gun butt. This socket is furnished with a locking device normally operative to prevent accidental removal of the gun from the hook, but which is automatically unlocked when the wearer thrusts his hand into the mitt preparatory to using the gun.

Other and further advantages of the present invention, together with a more extended explanation of a practical embodiment thereof, will be pointed out in the following detailed description and by reference to the accompanying drawings, wherein—

Fig. 1 is a right side elevation, with portions of the casing removed, showing the parts of the gun in the positions which they occupy just after firing, and with the barrel temporarily locked in extreme forward position, and indicating in broken lines the immediate subsequent position of certain parts associated with the barrel which actuate the cartridge holder thereby to place a fresh cartridge in firing position;

Fig. 2 is a horizontal section substantially on the line 2—2 of Fig. 1;

Fig. 3 is a side elevation, partly broken away, showing the several parts at the instant of firing;

Fig. 4 is a section substantially on the line 4—4 of Fig. 3;

Fig. 5 is a side elevation showing that side of the gun which is opposite to that illustrated in Fig. 3, with the cartridge holder cover removed away and a portion of the cartridge holder shown in radial section;

Fig. 6 is a plan view of the gun with certain parts broken away;

Fig. 7 is a front end elevation of the gun with certain parts omitted;

Fig. 8 is a rear elevation of the gun;

Figs. 9 and 10 are fragmentary horizontal sections, substantially on the line 9—9 of Fig. 5, showing portions of a safety device, disposed in safety and firing positions, respectively;

Fig. 11 is a fragmentary vertical section, substantially on the line 11—11 of Fig. 6, showing the trigger-actuated pin which releases the sear in firing;

Fig. 12 is a fragmentary plan view of the parts shown in Fig. 11;

Figure 13:
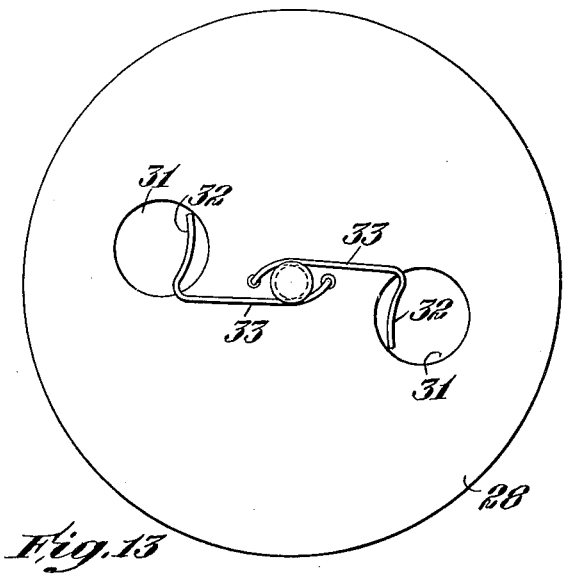
Fig. 13 is a side elevation of the cartridge holder.

Referring to the drawings, the numeral 1 indicates the frame of the gun, such frame being of steel or other suitable metal and including a transverse rear flange 2 (Fig. 2), to which is secured the butt 3, the latter being of wood or other suitable material. The frame also includes a front flange 4 and has a substantially cylindrical tubular extension 5 projecting forwardly from the center of the flange 4, this extension 5 constituting a guide for the rear end 6a of the axially movable barrel 6, the barrel being arranged to slide longitudinally in this guide. The flange 4 of the frame is also furnished with a forwardly directed lip 7, to which the rear end of a secondary frame or case 8 is secured by screws or the like, the casing 8 preferably having substantially flat, parallel, vertical side walls and a substantially vertical front end wall, the latter being provided with a guide aperture defined by an inwardly-directed flange 9, which constitutes a guide for the forward end of the barrel. This secondary or auxiliary frame or case 8 is preferably furnished with openings 10 in one at least of its side walls near its junction with the main frame, and also with the openings or slots 11 in its forward wall, such openings providing for the circulation of air through this casing, thereby to keep the barrel cool during firing. Mounted on the top of the auxiliary frame or casing 8 is an elongate member 12 forming a finish for the upper forward part of the gun and which carries the front sight 12a at its forward end.

The main frame is hollow to provide a housing for the cartridge holder and associated parts and is provided with a stud 13 projecting inwardly to the left from its right-hand wall, such stud being of circular section and constituting a breech block.

Figure 17:
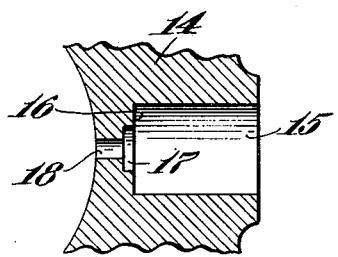
Fig. 17 is a fragmentary radial section through the cartridge holder.

The cartridge holder (Figs. 2, 4, 5 and 17) comprises an annulus 14 whose inner diameter is such as to permit it to be slipped over the stud 13 and to have a free turning fit thereon. The annulus is of substantial transverse thickness and of sufficient mass and strength to withstand the stresses to which it is subjected in use. As illustrated, this annulus 14 has twelve radial cartridge-receiving chambers 15 (Fig. 17), each having a rigid inner wall 16 for engagement with and to form a solid abutment for the head of the cartridge. Preferably this wall 16 has a center recess 17 thereby to avoid contact with the primer of the cartridge, particularly if the latter should protrude slightly. The wall 16 also has an axial passage 18 for the accommodation of the firing spur.

One face of the annulus 14 (as here shown the right-hand face, Fig. 1) is provided with two concentric series of elongate wedge-like socket openings, the openings 19 constituting one series alternating with the openings 20 of the other series. The openings 19 are deepest and terminate abruptly at their rear ends and are designed for engagement by a spring detent pin 21 (Fig. 1) operative to prevent reverse rotation of the holder. On the other hand the socket openings 20 are deepest and terminate abruptly at their forward ends and are designed for operative engagement by a cartridge-holder actuating pin 22 hereafter more fully described.

Figure 14:
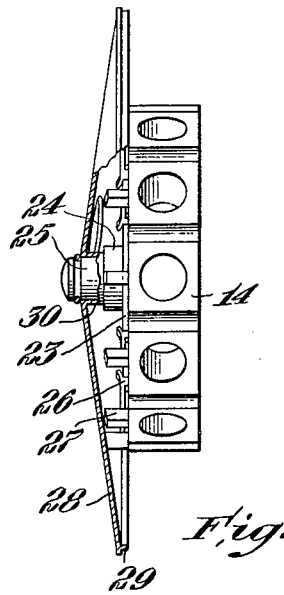
Fig. 14 is an edge view, partly in diametrical section, of the cartridge holder.
Figure 18:
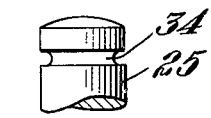
Fig. 18 is a fragmentary diametrical section through the outer end of the retaining stud for the cartridge holder.

At its opposite side (Figs. 2, 4, 13 and 14) the annular holder 14 is provided with a plate 23 having a central tubular hub 24 which fits over a cylindrical axial boss 25 (Figs. 2, 4 and 16) projecting from the left-hand side of the stud 13. This plate 23 is furnished with a series of openings for the passage of spring detents 26 corresponding in number to the cartridge-receiving chambers, and each designed to engage the usual groove adjacent to the head of a cartridge C, thereby to retain the cartridges in the chambers in the holder. The plate 23 is also provided with outwardly projecting blocks 27 to which the cover plate 28 is secured. This cover plate is circular (Figs. 13 and 14) and preferably of sheet metal and has a rim 29 which fits within and freely turns in a circular opening concentric with the stud 13 at the left-hand face of the frame. The cover 28 has a central aperture defined by a tubular hub 30 which slips over the boss 25 and turns freely on the latter. The cover also has apertures 31 (Fig. 13) for the insertion of the fingers of the user and across which extend the parts 32 of resilient retainer-clips 33 whose inner ends are fixed to the cover and which normally engage a peripheral groove 34 (Fig. 18) in the outer part of the boss 25 thereby to retain the cover and cartridge holder in operative position. However, mere insertion of the thumb and finger into the openings 31 so moves the parts 32 as to flex the clips 33 out of the groove 34, thus unlocking the cover and allowing the holder to be withdrawn from the stud 13. In putting a loaded holder in position, the holder with its cover is slipped part way onto the stud 13 and turned slightly until the pin 22 engages the abrupt terminus of one of the slots 20. The holder is then pushed all of the way in, whereupon the clips 33 snap into groove 34 thus retaining the parts in place although permitting free rotation of the holder.

The breech block is constituted by the stud 13 and has a diametrical guideway 35 for the reception of the hammer 36, the latter having the firing spur 36$^a$ at its forward end. The guideway 35 terminates in a passage 36$^b$ which, when the cartridge holder is stationary, aligns with the passage 18 leading to the cartridge chamber which is then in firing position.

An actuating lever 13$^a$ is pivotally secured (by means of a pin 13$^b$ concentric with the axis of the cartridge holder) to the right-hand side of the frame at the outside of the latter. To the lever 13$^a$ there is secured a flexible spring detent 13$^c$ having an end 22 which is directed inwardly toward the frame and which passes through an elongate arcuate slot 13$^d$ in the lever, and a corresponding slot 13$^e$ in the wall of the frame, the inwardly directed end 22 of the pin being designed successively to engage the openings 20 of the cartridge holder and, as the lever is rocked, to turn the holder through an arc corresponding to the angular distance between the axes of successive cartridge chambers. The lower end of the lever 13$^a$ is provided with an elongate slot 13$^f$ which receives an actuating stud 13$^g$ projecting laterally from a slide member 13$^h$. The forward end of this slide member is secured to a collar 37, forming the rear end of a sleeve-like piston 37$^a$, having an inwardly directed flange 38 (Fig. 4) which slides on the barrel 6. The main part of the sleeve 37$^a$ is spaced from the barrel to provide a gas-receiving chamber 39 (Fig. 2), the rear end of the sleeve sliding freely over the forward end of the extension 5 of the main frame. Small gas passages 39$^a$ (Fig. 2) lead from the interior of the barrel in the chamber 39.

A coiled compression spring 40 embraces the sleeve 37$^a$ and bears at its rear end against the collar 37 and at its forward end against a radial flange 41 which is integral with or fixedly secured to the barrel 6. Forwardly of the flange 41 the barrel 6 is embraced by a coiled compression spring 42, the rear end of which bears against the flange 41 and the forward end of which embraces the guide boss 9 of the case 8 and bears against the front wall of the latter. To the rear of the guide boss 9 the barrel is furnished with a fixed stop collar or flange 43 which is designed to engage the inner edge of the guide boss 9 and thus to limit forward movement of the barrel. From the left-hand side of the collar 37 there projects a finger piece 44 extending out through an elongate slot 45 in the case 8 and which is employed in the initial cocking of the gun.

Figure 19:
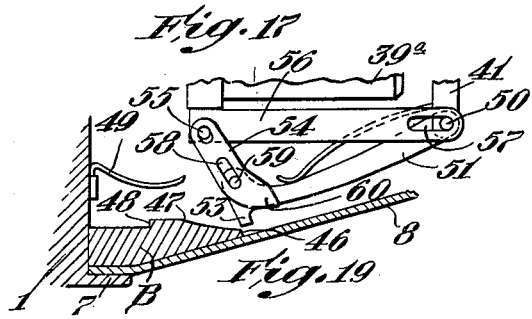
Fig. 19 is a fragmentary detail showing the barrel locking dog.

The lower wall of the case 8 is provided near its rear end with an internal boss B (Figs. 2, 3 and 19) having an abrupt, forwardly facing shoulder 46 and an inclined surface 47 leading rearwardly from the upper edge of said shoulder and terminating at a second abrupt but rearwardly facing shoulder 48. Directly above this shoulder 48 a retaining spring 49 is secured to the forward wall of the main frame, the spring inclining downwardly and being designed to hold certain of the parts in proper position during firing, as hereafter described.

The flange 41 which is carried by the barrel is furnished with a transverse pin 50 to which is pivotally secured the forward end of a locking dog 51, the rear end of which is pressed downwardly by a spring 52. The rear end of this dog is furnished with a toe 53 (Fig. 19) which is designed at times to engage the stop shoulder 46 and thereby to prevent rearward movement of the dog 51, the collar 37 and the barrel 6. A dog-lifting lever 54 is pivotally mounted at 55 upon the forward end of a horizontally sliding bar 56 having an elongate slot 57 at its forward end which receives a portion of the pin 50. The lever 54 is furnished with an elongate slot 58 which receives a pin 59 projecting from the rear end of the dog 51, and the lower part of the dog-lifting lever 54 is shaped to provide a toe 60 designed in certain positions of the lever 54 to engage the upper surface of block B and thereby to lift the rear end of the dog 51 up from behind shoulder 48 and thereby unlock the barrel to allow forward movement of the latter.

The forward end of a sear 61 is pivotally secured at 62 to the flange 41 carried by the barrel 6. This sear is a substantially straight rigid rod which inclines upwardly and rearwardly and whose rear end slides in an upwardly and rearwardly inclined passage 63 (Fig. 11) in the upper part of the main frame. This passage 63 intersects a substantially cylindrical chamber having a vertical axis, within which is housed the rotary safety plug 64 (Figs. 9, 10, 11). This safety plug is substantially cylindrical and has a diametrical upwardly and rearwardly inclined aperture or passage 65 which, when aligned with the sear 62, permits the latter to move rearwardly. The plug 64 is provided with a vertical slot or guideway for the reception of the trigger-actuated release pin 66, which normally projects down so as to block the passage 65, but which may be lifted so as to clear the passage 65. The upper end of this member 66 is provided with an aperture which receives a finger 67 projecting from the forward end of the trigger lever 68, the latter being pivotally mounted at 69 and having a rearwardly projecting arm provided with the thumb piece or trigger 70. A spring 68$^a$ tends to depress the forward end of the lever 68 and thus normally to hold the pin in its lower position where it blocks passage 65.

The pivotal support for the trigger is furnished by a member 71 (Figs. 1, 3, 5, 6 and 12) having the substantially parallel arms 72 and 73 united by a curved part which embraces the plug 64 and which is fixedly secured to the latter. The arm 73 of this trigger support is extended rearwardly so as to overlap the trigger and form a trigger guard, and its rear portion 74 is provided with an inclined surface 75 designed to be engaged by the thumb of the user as the thumb is moved toward the trigger 70, the parts being so positioned that in engaging the thumb with the trigger the thumb first engages the surface 75 and thereby laterally swings the arm 74 together with the trigger, from the full line or safety position of Fig. 6 to the broken line position of the same figure. Normally, the member 66 is in its lowermost position, thus blocking the passage 65, and normally the plug 64 is in the position shown in Fig. 9, with its passage 65 out of alignment with the sear and the passage 63 in the frame.

Figure 16:
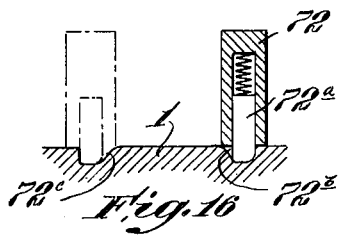
Fig. 16 is a fragmentary vertical section illustrating the detent for the trigger guard.

As shown in Fig. 16, the arm 72 of the trigger support is provided with a spring-pressed detent 72$^a$ designed alternatively to engage either of a pair of notches 72$^b$ or 72$^c$ in the upper surface of that portion of the frame over which the arm 72 swings. The adjacent edges of the notches 72$^b$ and 72$^c$ are sloped so as to enable the detent to disengage the notches in moving from one to the other, but their remote walls are abrupt so as to form limiting stops for the lever arm 72.

The hammer 36 is actuated by a lever 76 (Fig. 2) mounted in a slot in the frame and pivoted upon a vertical pin 77. This lever is furnished with a slotted inner end 78 which straddles a vertical pin carried by the hammer, and at its outer end is furnished with a rounded head 79 which is received within an elongate slot 80 (Fig. 1) in the slide member 13$^h$.

The right-hand side of the frame is normally covered by means of a removable cover member 81, and to this cover member is firmly secured a mitt or socket member 82 designed to receive the hand of the user. This mitt or socket member may be of any suitable, preferably flexible, material, for example, leather, cloth, rubber, etc. Preferably this mitt is of such a nature, inherently or by the inclusion of spring elements, as snugly to grip the inserted hand of the user so as to provide a firm and reliable attachment of the gun to the hand. In this connection it may be noted that the hand of the user is inserted in this mitt with the fingers extended, so that the palm of the hand lies flat against the outer surface of the cover 81 and substantially parallel to the vertical plane of the axis of the barrel, the thumb being free from the mitt and conveniently positioned to reach the trigger.

Figure 20:
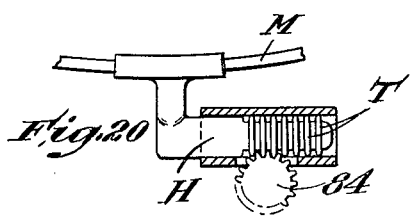
Fig. 20 is a fragmentary plan view, partly in horizontal section, illustrating means for supporting the gun upon the belt of the user.

Preferably, the rear end of the frame is furnished with a socket opening 83 (Fig. 2) designated to receive a suitable hook H (Fig. 20) attached to the belt M of the user. This socket opening 83 is furnished with a locking device which may take the form of a toothed wheel 84 having its periphery projecting into the socket opening and designed to mesh with teeth T formed on the side of the hook so that as the hook is introduced into the socket the wheel will be rotated in the same manner that a pinion is rotated by an associated rack. When the hook has properly been seated in the socket a detent or ratchet device 85 holds the wheel 84 from reverse rotation so that the hook cannot be withdrawn from the socket, or in other words, the gun cannot be removed from the hook until the detent has been released. For releasing the detent it is preferred to provide a suitable release lever 86 disposed within the mitt 82 in such position as to be contacted by the fingers of the user as they are pushed into the mitt. This lever is secured to a shaft 86$^a$ provided with a cam 86$^b$ which engages a pin at the upper end of the detent rod 85, so that lifting of the free end of the lever disengages the detent from the wheel 84. Thus mere introduction of the hand into the mitt automatically unlocks the wheel 84 so as to permit the gun to be removed from the hook.

Preferably an agitating plate 87 is mounted upon the flange 41 of the barrel within the auxiliary case 8, so that as the barrel moves backwardly and forwardly this member 87 will be rapidly moved and thus cause a circulation of air within the case 8, the member 87 with the enclosing casing also to a certain extent functioning as a dash-pot to lessen the shock in the rapidly moving parts.

If the user should hold the trigger depressed following discharge of the last round in the holder, the barrel would be permitted to return to firing position and in this event, in order to remove and replace the cartridge holder, it is necessary that the barrel first be moved to its forward or cocked position, for otherwise the protruding ends of the cartridge cases could not be moved from or toward firing position. To this end the user first pushes the finger piece 44 forwardly until the piston 37$^a$ and the barrel 6 have been advanced for enough to clear the sear 62 from the passage 65 in the plug 64, the operator now placing the trigger guard in safety position. The barrel is now held in forward cocked position by engagement of the rear end of the sear 62 with the side of the plug 64, and thus the breech end of the barrel is cleared from the cartridge case in the holder, allowing the latter to be withdrawn and a new holder to be inserted.

The gun is now in readiness for firing. In firing, the operator first moves his thumb toward the trigger 70 and in so doing swings the guard member 75 to the left so far as detent 72$^a$ will permit, carrying with it the trigger. In thus swinging the guard to the left, the plug 64 is swung so that the passage 65 therein is aligned with the opening 63 in the casing. The user now depresses the trigger 70 by means of his thumb, thereby lifting the forward end of the trigger lever and thus raising the stop member 66 from out of the path of the sear 62. The latter is thus permitted to move backwardly in response to the action of the compressed spring 42, and concomitantly the barrel 6 moves rearwardly toward firing position in which its breech end telescopes over and houses the forward end of the cartridge C and abuts firmly against the edge of the cartridge-holding magazine.

As the barrel nears its rear-most or firing position, the toe 53 of the dog 51 drops behind the stop shoulder 48 where it is held firmly in position by means of the spring 49, and the barrel is thus positively locked against forward movement. As the barrel approaches its rearmost or firing position, the slide 13$^h$ is also moved by means of the sleeve 37$^a$, which is positively driven rearwardly by its contact with the flange 41 of the barrel, and when the forward end of the slot 80 engages the outer end of the lever 79 the hammer 36 is moved forward, driving the firing spur 36$^a$ through the passages 36$^b$ and 18 and into firing contact with the primer, thus firing the cartridge.

As the bullet moves forwardly through the gun barrel, the high pressure gas passes through the small openings 39$^a$ into the chamber 39 of the sleeve-like piston 37$^a$ and acting against the inner wall of the flange 38 drives the piston 37$^a$ forwardly, carrying with it the collar 37. As this collar moves forwardly it carries with it the pin 55 and thus swings the lever 54, thereby prying up the toe 53 from behind the stop shoulder 48 and permitting the barrel to move forwardly. As the barrel moves forwardly it compresses both springs 40 and 42, and at the same time carries the sear 61 with it so that the rear end of the latter is moved out of the passage in plug 64. If the trigger is at once released, the member 66 immediately drops behind the rear end of the sear so that the latter cannot move rearwardly again until the trigger is again depressed. As the force of the gas is expended within the sleeve-piston 37$^a$, the spring 40 immediately starts to move the sleeve 37$^a$ rearwardly, but before it begins to move rearwardly the toe 53 of the dog 51 has dropped behind the shoulder 46, thus temporarily locking the barrel in its forward position. However, the sleeve 37ᵃ moves rearwardly a short distance, and in so doing moves the slide 13ʰ far enough to the rear to swing the lever 13ᵃ and thereby turn the magazine or cartridge holder so as to place a fresh cartridge in alignment with the barrel. However, as the sleeve 37ᵃ completes its rearward movement, the lever 54 pulls the toe 53 up from in front of shoulder 46, thus releasing the barrel for rearward movement except as such movement may be prevented by the sear.

Upon the next depression of the trigger the above cycle of operations is repeated, or, if the trigger be held depressed, the gun will continue to perform this cycle of operations until all of the cartridges in the magazine have been exhausted.

Figure 15:
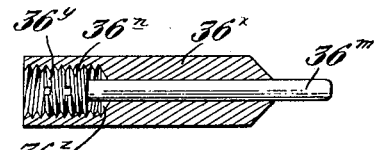
Fig. 15 is a longitudinal section of a preferred form of hammer.

A preferred construction of hammer and firing spur is illustrated in Fig. 15, wherein the hammer 36ˣ, corresponding in general to the hammer 36 above referred to, is of tubular construction and provided at its rear end with an enlarged bore 36ᶻ which is internally screw threaded. The firing spur 36ᵐ is a pin designed to slide longitudinally in the bore in the tubular hammer and is provided with a slotted, externally screwthreaded head 36ⁿ which engages the screw thread at 36ᶻ. By engaging the slot in this head with a screw driver the spur 36ᵐ may be adjusted longitudinally of the hammer to adapt it to the ammunition being used or so that wear may be compensated for, and accuracy of firing insured. A lock nut 36ʸ may be provided for locking the spur in adjusted position.

While desirable embodiments of the invention have herein been illustrated by way of example, it is to be understood that the invention is not necessarily limited to the precise construction herein chosen for illustration, but is to be regarded as broadly inclusive of any and all such modifications thereof as fall within the terms of the appended claims.

I claim:

1. A firearm having a movable cartridge holder provided with a plurality of chambers, each of such depth that a portion of the case of a cartridge seated in the chamber protrudes from the holder, an axially movable barrel whose breach end houses the protruding portion of the cartridge case at firing, means responsive to firing for moving the barrel forwardly thereby to release the cartridge case from the breech of the barrel, means tending to return the barrel to firing position, means operative to move the holder thereby to place a fresh cartridge in firing position, and means operative temporarily to hold the barrel in forward position while the holder is being so moved.

2. A firearm of the class described having an axially movable barrel, a movable cartridge holder having a plurality of chambers movable successively into firing position in which they are axially aligned with the barrel, a barrel-actuating piston arranged to respond to pressure of gas generated at firing and thereby to move the barrel to a forward position, spring means operative to move the piston in the opposite direction when the force of the gas has been expended, and means operative by the piston, in its return movement, for moving the holder, thereby to place a fresh cartridge in line with the barrel.

3. A firearm having a movable cartridge holder provided with a plurality of chambers, each of such depth that a portion of the case of a cartridge seated in the chamber protrudes from the holder, an axially movable barrel whose breech end houses the protruding portion of the cartridge case at firing, a gas-actuated annular piston arranged to slide axially of the barrel and to move forwardly in response to gas pressure generated at firing, an abutment on the barrel engageable by said piston whereby forward movement of the latter moves the barrel forwardly, a spring for returning the piston to normal position when the gas pressure drops, means for locking the barrel temporarily in forward position, means actuated by the piston, as the latter starts its return movement, to turn the cartridge holder thereby to place a fresh cartridge in firing position, and means also actuated by the piston, during its return movement, to unlock the barrel.

4. A firearm of the class described having an axially movable barrel, a movable cartridge holder having a plurality of chambers movable successively into alignment with the barrel, a barrel actuator responsive to gas pressure generated at firing to move the barrel forwardly, means operative to lock the barrel temporarily in forward position, means operative to restore the barrel actuator to normal position when the force of the gas has been expended, means operable by the barrel-actuator during the early part of its return movement, to move the cartridge holder so as to place a fresh cartridge in firing position, means also operated by the barrel actuator, as it continues its return movement, to unlock the barrel from forward position, and spring means for restoring the barrel to firing position.

5. A firearm having a movable cartridge holder provided with a plurality of chambers, each of such depth that a portion of the case of a cartridge seated in the chamber protrudes from the holder, an axially movable barrel whose breech end houses the protruding portion of the cartridge case at firing, a gas-operated actuator arranged to slide axially of the barrel and to move forwardly in response to gas pressure generated at firing, means normally locking the barrel in firing position, means for locking the barrel in a forward position, means operated by the actuator, as the latter starts forward, to unlock the barrel from firing position, an abutment on the barrel engageable by the forwardly moving actuator thereby to move the barrel to its forward position, a spring operative to return the actuator to normal position when the gas pressure drops, means operable by the actuator, as the latter initiates its return movement, to turn the cartridge holder thereby to dispose a fresh cartridge in firing position, and means operative by the actuator, as the latter continues its return movement, to unlock the barrel and allow the latter to return to firing position.

6. A firearm of the class described having a barrel and firing mechanism including a movable sear, a trigger and a trigger guard, the latter being movable from a safety to a firing position, a stop connected to the trigger guard and normally positioned in the path of the sear, and a stop actuable by the trigger and which is also normally positioned in the path of the sear, the sear being free to move to firing position only upon concomitant removal of both of said stops from its path.

7. A firearm of the class described including a barrel and firing mechanism, an elongate, longitudinally movable sear, a rigid rotary plug disposed in the path of movement of the sear, said plug having a passage therein which, when it is aligned with the sear, permits movement of the latter transversely of the plug, a safety guard, and means so connecting the guard to the plug that only when the guard is in firing position is the passage in the plug aligned with the sear.

8. A firearm of the class described having a barrel and firing mechanism, an elongate, longitudinally movable sear, a rigid rotary plug disposed in the path of movement of the sear, said plug having a transverse, substantially diametrical passage which, when it is aligned with the sear, allows the end of the latter to enter the plug, the plug also having an axial passage, and a movable pin in said latter passage normally obstructing the transverse passage, a safety guard connected to the plug, and a trigger connected to the pin, the sear being unable to move longitudinally to firing position, except the guard and trigger be so actuated as to align the transverse passage in the plug with the sear and to withdraw the pin from across said transverse passage.

9. A firearm comprising a barrel, a holder having a plurality of cartridge chambers, and means for moving the holder thereby to align successive chambers with the barrel, the chambers being of such depth as to leave the outer portion of the cartridge case exposed, and means for so relatively moving the barrel and holder prior to firing as to house said exposed portion of the cartridge within the breech of the barrel while firing takes place.

10. A firearm comprising a cartridge holder having chambers of such depth that the forward ends of the cartridge cases protrude therefrom, an axially movable barrel whose breech portion houses such protruding portion of the cartridge case at firing, means operative to lock the barrel in forward position, and means operative to move the cartridge holder, while the barrel is so locked in forward position, thereby to place another cartridge in alignment with the barrel.

11. A firearm of the class described having a rotary cartridge holder provided with radial chambers, each chamber having a rigid bottom wall for engagement by the head of the cartridge, each such bottom wall having a recess coaxial with the primer and having an axial aperture for the entrance of the firing spur, each chamber being of such depth that a substantial portion of the cartridge case protrudes from the holder, and a barrel whose breech portion, when in firing position, houses the protruding portion of the cartridge case.

12. A repeating firearm of the kind in which the cartridges are disposed in radial chambers in a rotary holder, and wherein the barrel, when in firing position, is aligned with one of the chambers of the holder, characterized in that the chambers of the holder are of such depth that the cartridge cases protrude therefrom, the parts being so designed and arranged that the breech of the barrel houses the protruding portion of the cartridge case at firing, whereby the cartridge case bridges the crevice between the holder and the juxtaposed end of the barrel.

GEORGE C. WHITING.